(12) United States Patent
Featherston et al.

(10) Patent No.: US 6,222,182 B1
(45) Date of Patent: Apr. 24, 2001

(54) APPARATUS AND METHOD FOR SAMPLING A PHOTOTRANSISTOR

(75) Inventors: Lord Nigel Featherston, Redmond; Charles Salvatore Mauro, Jr., Woodinville; Mark R. Lee, Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/201,697

(22) Filed: Nov. 30, 1998

(51) Int. Cl.$^7$ ................................. G01D 5/34; G09G 5/08
(52) U.S. Cl. ................................. 250/231.13; 250/214 R; 345/165
(58) Field of Search ........................... 250/231.13, 231.14, 250/231.18, 214 R, 221; 345/163, 165, 166, 167; 327/514, 515

(56) References Cited

U.S. PATENT DOCUMENTS

| 5,252,968 | 10/1993 | Donovan .......................... 250/231.14 |
| 5,384,457 | 1/1995 | Sommer . |
| 5,898,170 | * | 4/1999 | Featherston et al. ........... 250/231.18 |

FOREIGN PATENT DOCUMENTS 0 310 230    4/1989   (EP) .

* cited by examiner

*Primary Examiner*—John R. Lee
*Assistant Examiner*—Kevin Pyo
(74) *Attorney, Agent, or Firm*—Klarquist Sparkman Campbell Leigh & Whinston, LLP

(57) ABSTRACT

Sampling of a phototransistor in an optical encoding system is controlled by "turning on" the phototransistor, after light has already charged the base of the phototransistor at least somewhat, by applying a potential difference across the collector and emitter of the phototransistor, producing an essentially instantaneous emitter response, which is then sampled.

19 Claims, 3 Drawing Sheets

APPARATUS AND METHOD FOR SAMPLING A PHOTOTRANSISTOR

TECHNICAL FIELD

This invention relates to apparatus and methods for sampling the output of a phototransistor, particularly for optical encoding systems employing phototransistors in user input devices such as thumb-wheels, finger-wheels, mice, trackballs, and the like. More particularly, this invention relates to an opto-mechanical encoding system in which a potential difference is applied intermittently across the collector/emitter of a phototransistor to control sampling of the phototransistor output so as to provide an essentially immediate response representative of the light flux at the phototransistor. The apparatus and methods of this invention may also be applied to other transistors.

BACKGROUND OF THE INVENTION

User input devices such as mice and trackballs for use with computers and other electronic devices commonly use opto-mechanical encoding to sense position and/or movement. Motion of the ball of a mouse or trackball, or motion of the wheel and/or shaft of a thumb- or finger-wheel, for example, typically rotates a pair of encoding wheels having light-transmitting and light-blocking regions Each encoding wheel is typically positioned between one or two light sources in the form of LEDs (light emitting diodes) and two light sensors in the form of PTRs (phototransistors). For each PTR, the surface area of the PTR exposed to the light from the LED(s) is directly correlated with the position of the encoding wheel, and may be approximately represented by a periodic function of the position of the encoding wheel. The signal voltage at the emitter of each PTR is, in typical configurations, directly proportional to the surface area of the PTR exposed to light. The light source(s) and the two PTRs are typically positioned, relative to each other and to the encoding wheel, such that the signal voltage from one PTR varies approximately in quadrature with the signal voltage from the other PTR, as a function of the position of the encoding wheel. The signals from the two PTRs, taken together, are thus representative of the velocity and direction of motion of the encoding wheel: the frequency of the signals indicates the velocity, and the relative phase indicates the direction, of the encoding wheel.

A typical input device includes at least two (one for each of two orthogonal directions of ball rotation), and often three encoding wheels, resulting in the use of four or six PTRs, and a minimum of 2 or 3 LEDs. A microcontroller is employed to control and interpret the sampling of the PTRs and to provide communication with a host device.

Some optical encoding methods require sample times of 50–100 μs or more. Many traditional opto-mechanical encoding systems, while reliable and low-cost, may require as much as a 3–4 mA average, and 10 mA peak, current. Minimizing this current draw provides an important advantage in battery-operated or parasitically powered devices. Long sampling intervals tend to result in higher average current than short sampling intervals. Long sampling intervals also limit the tracking performance. Shorter intervals allow higher-resolution tracking, or higher-speed tracking without aliasing, or both.

SUMMARY OF THE INVENTION

According to the present invention, a PTR in an optical encoding system is driven or "turned on," for sampling, by the application of a potential difference across its collector and emitter. A driving signal for producing the potential difference may be supplied, for example, from an output pin of an optical encoding system microcontroller.

An LED associated with the phototransistor may be excited with a low, continuous current. Prior to sampling the PTR, the collector and emitter are held at the same or nearly the same potential. Light from the LED reaching the PTR creates an excess of charge in the electrically isolated base of the PTR. As long as the potential between the emitter and collector of the phototransistor remains zero, transistor action cannot occur. Upon switching the voltage at the collector and/or emitter such that the collector/base junction is back biased and the base/emitter junction is forward biased, electrons can flow, transistor action can occur, and the PTR creates a large and very rapid current flow, in effect causing nearly instantaneous PTR response. For PTRs arranged for sampling of the emitter response, this virtually eliminates the effects of the collector/base capacitance on the emitter response time. Since the current developed by the PTR is proportional to the amount of light received by the PTR, the net effect is that the initial rising edge of the emitter output reaches a voltage level proportional to the modulation level of the encoder wheel, with a subsequent decay.

With the present invention, LED current may be set to a relatively low value, such as 1 to 1.5 mA or even lower, resulting in the advantage of some power savings. The LED may also have a reduced duty cycle, for further power savings.

In applications where high performance is required, the fast emitter response can allow very high sampling rates, in excess of 5 kHz if desired, thus enabling realization of high performance systems with greater tracking velocity and/or higher resolution than most current designs.

Additional features and advantages of the invention will be made apparent from the following detailed description of an illustrated embodiment, which proceeds with reference to the accompanying drawings.

DETAILED DESCRIPTION OF THE INVENTION

Figure 1:
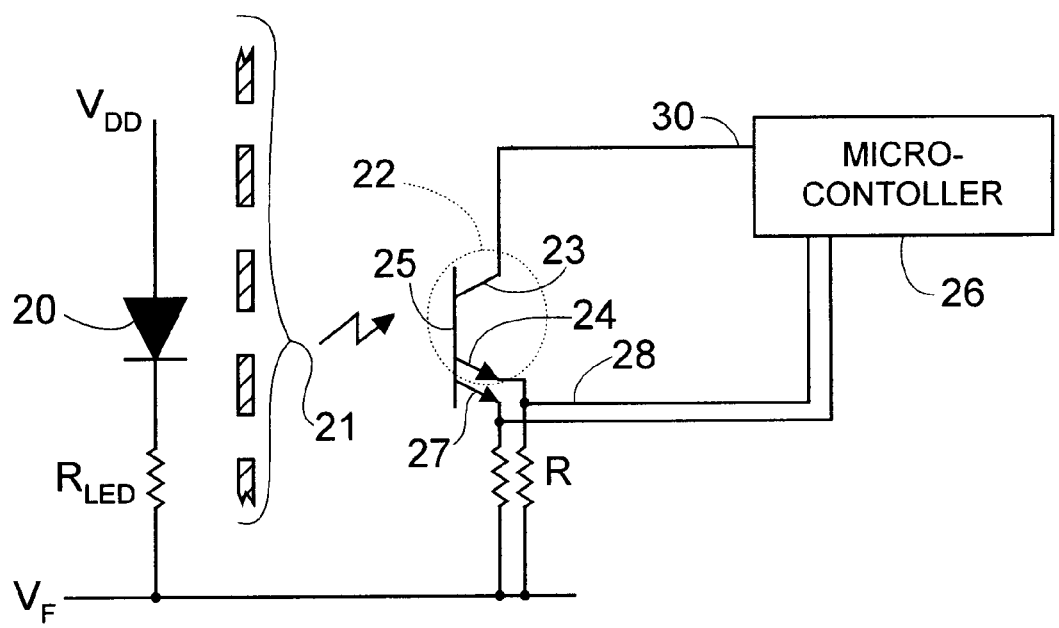
FIG. 1 is a diagram of an embodiment of a system of the present invention.

An example embodiment of an apparatus of the present invention is shown in FIG. 1. An LED (light emitting diode) 20 is positioned near a PTR (phototransistor) 22 having a collector 23, an emitter 24, and a base 25 for receiving light from the LED 20. (A pair of phototransistors is normally used together, and an emitter 27 of a second phototransistor is shown accordingly.)

Between the LED 20 and the PTR 22 is a moveable optical encoder in the form of a rotatable optical encoding wheel 21 having alternating light-transmitting and light-blocking regions. Other suitable encoders may of course be potentially substituted, in locations appropriate to their type, including encoders having lateral rather than rotational motion, and encoders having alternating light and dark, or alternating reflective and non-reflective surfaces.

The light flux at the base 25 varies periodically as a function of the position of the encoder wheel 21. A microcontroller 26 samples the output of the emitter 24 on input/output line 28. The LED 20 is, in this embodiment, constantly turned on, but the PTR 22, in contrast, is turned on at its collector 23 by an output pin 30 of the microcontroller 26. The collector 23 is turned on, or driven high, just prior to sampling the output of emitter 24 via line 28.

Of course it is not essential that the PTR 22 be turned on at its collector 23. All that is required is that the potential difference across collector 23 and emitter 24 is switched from at or near zero (i.e., from a state at which little or no transistor action occurs) to a potential difference such that the collector/base junction is back biased and the base/emitter junction is forward biased. This effectively turns the PTR 22 on.

Turning on the PTR by switching the collector/emitter potential, (instead of by switching the LED, for instance) results in the output of the PTR occurring essentially instantaneously, not at the rate of the RC time constant of the PTR emitter circuit. In the described embodiment, emitter rise time is essentially identical to collector rise time, offset by a propagation delay of 10–°ns. If the collector driving waveform has a fast rise time in the range of about 10–°ns, the initial, peak emitter response is for all practical purposes instantaneous.

Figure 2A:
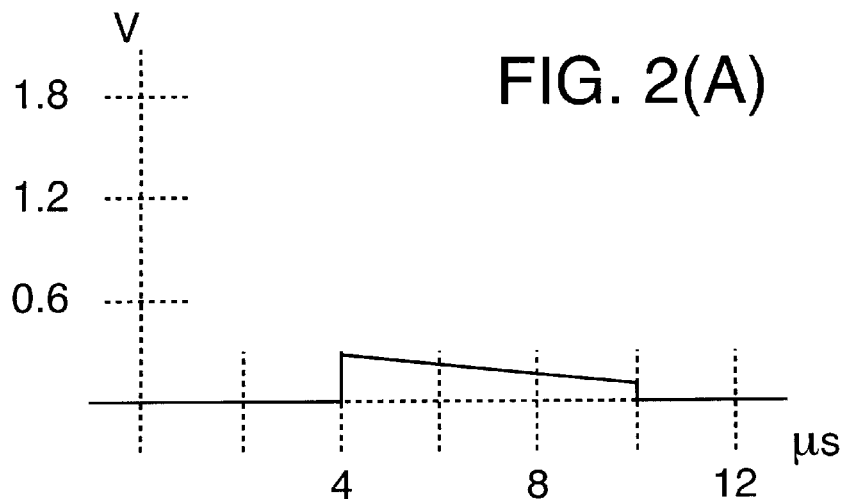
FIGS. 2(A), 2(B) and 2(C) are graph of an example input signal to a phototransistor as may be used in the present invention, together with output signals obtained with such input signal.
Figure 2B:
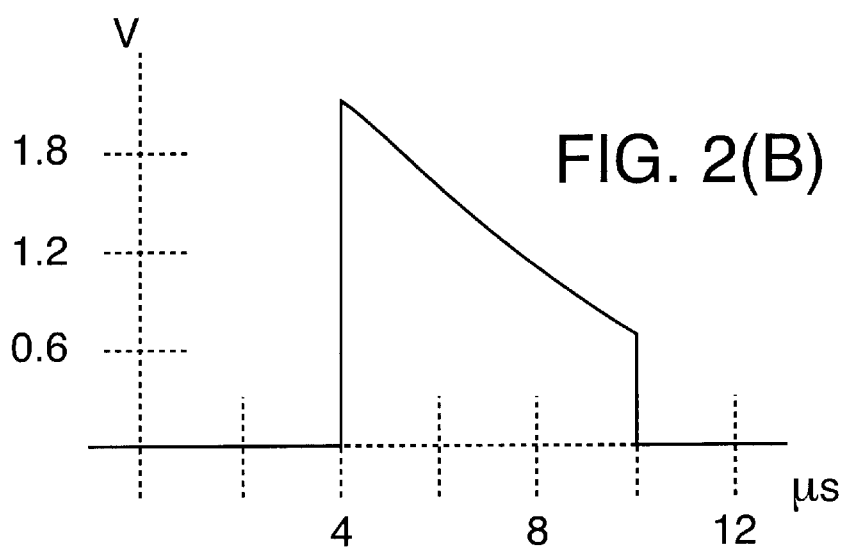
Figure 2C:
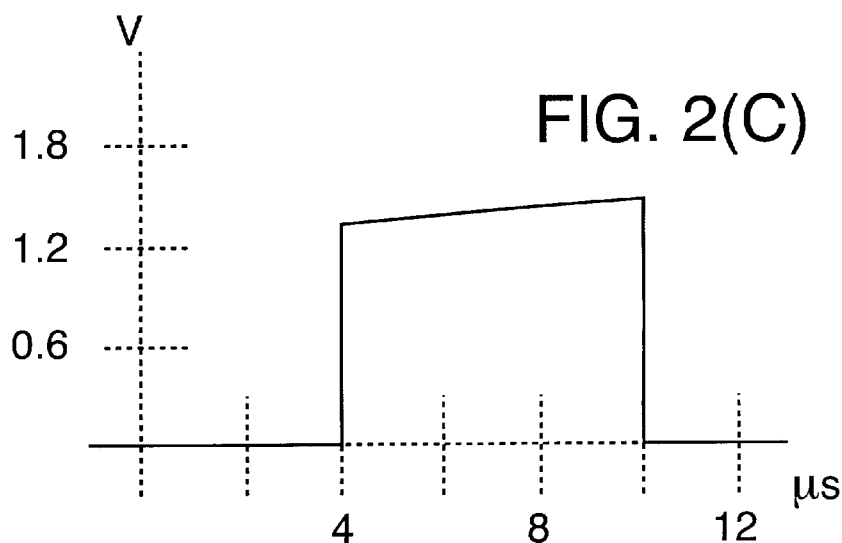

FIG. 2 is a graph representing actual response waveforms. Trace C is a waveform used to drive the collector, as may be produced by an output pin of a microprocessor. Trace A is the output waveform at the emitter when the light flux at the base is at a minimum and the collector is driven by the pulse in trace C. Trace B is the output waveform at the emitter when the light flux at the base is at a maximum and the collector is driven by the pulse in trace C. As may be seen from trace B, the response of the emitter is essentially instantaneous, with a rise time to peak response essentially equal to the rise time of the sampling pulse in trace C, but offset by a small propagation delay on the order of 10–20 ns. As shown, the rise time may be as short as 100 ns or less, even as short as 10–20 ns. The very short rise time allows quick sampling of the output signal without any prolonged wait for the signal to settle to the proper level.

Figure 3:
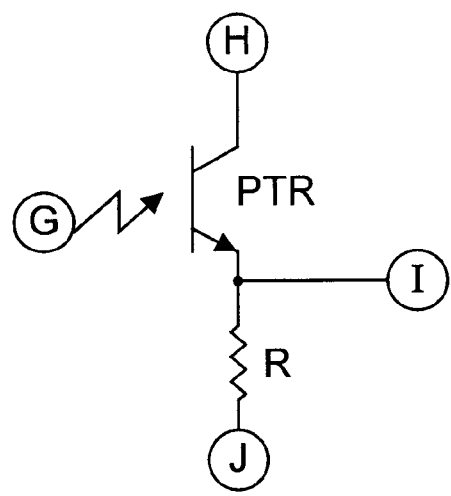
FIG. 3 is a diagram of a phototransistor with its various control or input/output points labeled for reference.

FIG. 3 shows a PTR with four control or input/output points labeled G through J. First the associated LED or other light source is turned on (if not already on) to provide light input at point G. The light need only be turned on sufficiently long before sampling the PTR so as to produce the desired near-instantaneous response on sampling the PTR. The PTR is then turned on imposing a potential difference across points H and J, and subsequently sampled by reading the voltage at point I. The potential difference may be imposed in any number of ways. For example, Point J may be held high, then switched low. Point H may be held low, then switched high. Point I may be held high, then switched to input mode and allowed to float to read the output signal voltage.

This method of sampling a phototransistor may be applied in similar fashion to transistors other than phototransistors. For example, in the case of a transistor other than a phototransistor, the light input at point G of FIG. 3 would be replaced by a signal line connected to the base of the transistor. A signal provided by such a signal line at point G may be sampled by allowing the signal to pre-charge the base of the transistor the potential difference across the base and emitter of the transistor at or near zero. Upon application of a potential difference across the base and emitter of the transistor, a resulting output may then be sampled as a voltage level at point I, or in any of various other ways known to those of skill in the art.

Figure 4:
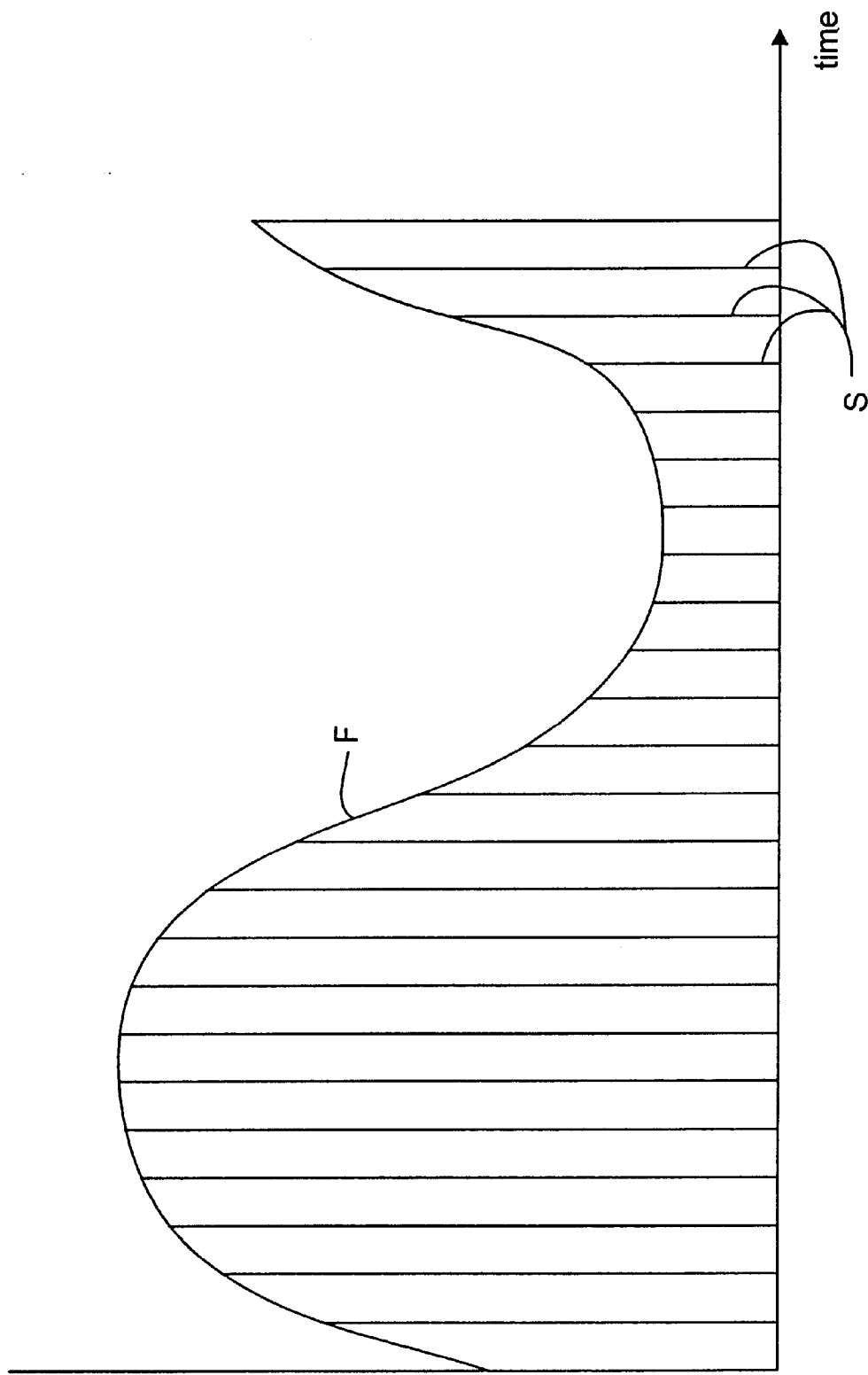
FIG. 4 is a graph showing multiple output signals from a phototransistor employed to sample a function F.

FIG. 4 is a graph of a function F similar to an output function that may be produced at the output of one PTR by the rotation of an encoding wheel in the present invention. Multiple samples S of the PTR output assist in detecting the relative position and motion of the encoding wheel. Each sample S corresponds to a waveform such as those shown in trace A and trace B of FIG. 2, but with the time axis significantly compressed.

It will be recognized that the illustrated embodiment can be modified by those of skill in the art without departing from the principles of the invention. When the potential difference is applied across the base and emitter of the transistor, the resulting performance of the transistor may be read or sampled in various ways, such as at the collector rather than at the emitter, and with various circuits or circuit elements known and used for such purposes by those of skill in the art. The basic process of sampling a transistor by first allowing charge to accumulate at the base thereof, and only then applying a potential difference across the collector and emitter, can also find application in any situation where fast response times or sharp-edged, easily detected responses are desirable.

In view of the many possible embodiments to which the principles of our invention may be applied, it should be recognized that the detailed embodiments are illustrative only and should not be taken as limiting the scope of the invention. Rather, we claim as our invention all such embodiments as may come within the scope and spirit of the following claims and equivalents thereto.

We claim:

1. An input device including an opto-mechanical encoding system comprising:

a light source;

a phototransistor having a collector, an emitter, and a base arranged to receive light from the light source to charge the base;

a moveable encoder structured so as to periodically vary light flux from the light source at the phototransistor base with motion of the encoder;

a microcontroller for controlling and sampling the phototransistor, wherein the microcontroller turns on the phototransistor when the light source is on and prior to sampling the phototransistor, by changing the potential difference across the collector and emitter from zero or near zero to a state in which the collector/base junction is back biased and the base/emitter junction is forward biased, therein providing an essentially immediate peak response from the phototransistor.

2. The input device of claim 1 wherein the light source is an LED.

3. The input device of claim 2 wherein the LED is connected to a voltage source so as to be constantly turned on during utilization of the encoding system.

4. The input device of claim 3 wherein the LED current is about 2 mA or less.

5. The input device of claim 1 wherein the microcontroller is connected to the emitter of the phototransistor for sampling the phototransistor.

6. The input device of claim 1 wherein the time from which the phototransistor is turned on until the occurence of the emitter peak response is less than 100 ns.

7. The input device of claim 1 wherein the microcontroller turns on the phototransistor by switching the collector from low to high.

8. The input device of claim 1 wherein the microcontroller turns on the phototransistor by switching the emitter from high to low.

9. An optical encoder circuit comprising:

a phototransistor having a collector, a base, and an emitter arranged to provide sampling of the phototransistor response to a variable light flux striking the base; and a signal source arranged to selectively turn off the phototransistor by causing application of little or no voltage across the collector and emitter for a period of time during at least a last part of which the base is exposed to the light flux, and selectively turn on the phototransistor by causing application of a voltage across the collector and emitter, wherein the time required to turn the phototransistor on and off and the signal source speed of the transition from off to on are such as to produce a peak phototransistor response representative of a then-present level of light flux at the base within 100 ns after turning the phototransistor on.

10. The optical encoder circuit of claim 9 wherein the phototransistor response signal is sampled at the emitter.

11. A method of sampling a phototransistor having a base exposed to a light flux, a collector, and an emitter, the method comprising the steps of:

(a) turning off the phototransistor by leaving the collector and emitter at substantially equal potential for a period of time during at least a last part of which the base is exposed to the light flux; and (b) turning on the phototransistor by applying a potential difference across the collector and the emitter for a period of time so as to produce a phototransistor response having a substantially immediate peak followed by a decay; and (c) sampling a response of the phototransistor.

12. The method of claim 11 further comprising the steps of:

providing light from an LED; and providing a moveable encoder device structured so as to periodically vary the light flux from the LED at the phototransistor base with the position of the moveable encoder device.

13. The method of claim 12 further comprising the step of powering the LED with a current of about 2 mA or less.

14. The method of claim 12 wherein the step of applying a potential difference across the collector and the emitter comprises increasing the positive potential of the collector.

15. The method of claim 12 wherein the step of applying a potential difference across the collector and the emitter comprises allowing the positive potential of the emitter to decrease.

16. The method of claim 11 wherein the step of sampling a response of the phototransistor comprises sampling a response of the emitter.

17. A method of sampling a phototransistor in a computer input device having a microcontroller and a light source wherein the phototransistor has a collector connected to an output pin of the microcontroller, a base, and an emitter, the method comprising the steps of:

(a) turning off the phototransistor by setting the output pin low while allowing the light source to charge the base of the phototransistor; and (b) turning on the phototransistor by setting the output pin high; and (c) sampling the emitter of the phototransistor.

18. The method of claim 17 wherein the step of setting the output pin high drives the collector of the phototransistor high with sufficient speed to cause the emitter to produce an immediate peak voltage response followed by a decay.

19. The input device of claim 1 wherein the microcontroller turns on the phototransistor by switching the emitter from high to a floating voltage level.

* * * * *